United States Patent [19]
Cleary

[11] 3,951,923
[45] Apr. 20, 1976

[54] PREPARATION OF AMINO-BENZENESULFONATE-MODIFIED POLYAMIDES

[75] Inventor: James W. Cleary, Bartlesville, Okla.

[73] Assignee: Phillips Petroleum Company, Bartlesville, Okla.

[22] Filed: Sept. 23, 1974

[21] Appl. No.: 508,649

Related U.S. Application Data

[63] Continuation-in-part of Ser. No. 370,155, June 14, 1973, Pat. No. 3,853,823, which is a continuation of Ser. No. 177,426, Sept. 2, 1971, abandoned.

[52] U.S. Cl. .............................. 260/78 A; 260/78 L
[51] Int. Cl.$^2$ ................ C08G 69/08; C08G 69/14; C08G 69/16
[58] Field of Search ..................... 260/78 A, 78 L

[56] References Cited
UNITED STATES PATENTS

| | | | |
|---|---|---|---|
| 3,142,662 | 7/1964 | Huffman | 260/78 R |
| 3,184,436 | 5/1965 | Magat | 260/78 R |
| 3,409,596 | 11/1968 | Unger et al. | 260/78 R |

FOREIGN PATENTS OR APPLICATIONS 233,904   12/1968   U.S.S.R.

OTHER PUBLICATIONS

Chemical Abstracts, Vol. 70, 1969, 12534n.
Chemical Abstracts, Vol. 71, 1969, 4177b.

Primary Examiner—Harold D. Anderson

[57] ABSTRACT

Polycarbonamide compositions having improved acid dye-resistance and basic dyeability properties wherein said polycarbonamides contain, as an integral part of the polymer chain, recurring amide linkages and terminal sulfonate groups resulting from alkali metal salts of aminobenzenesulfonic acids, as well as the process for producing the modified polyamide compositions. From 50 to 300 mol percent of an alkaline metal hydroxide per mol of aminobenzenesulfonic acid salt dyeability modifier is utilized to enhance the color and washability of the resulting compositions.

11 Claims, No Drawings

PREPARATION OF AMINO-BENZENESULFONATE-MODIFIED POLYAMIDES

This is a continuation-in-part of copending application Ser. No. 370,155 filed June 14, 1973, now U.S. Pat. No. 3,853,823 which in turn was a continuation of then copending application Ser. No. 177,426 filed Sept. 2, 1971, now abandoned.

This invention relates to synthetic polycarbonamides having improved acid dye-resistance and basic dyeability properties.

Unmodified nylon is dyeable to a single color only and is almost exclusively dyed with acid dyes that are absorbed by amino groups of the nylon molecules. The application of basic dyes which are absorbed by carboxyl groups of the nylon molecules results in colored nylon having unacceptable wash and light fastness properties. Nylon has been modified, however, to improve its dyeability by forming the nylon in the presence of a monofunctional, monosulfonated compound. The modified molecules serve a dual role. First, they provide sulfonate groups which can be activated to absorb basic dye under acid conditions without activation of the carboxyl groups, thereby providing color of acceptable wash and light fastness; secondly, they impart acid dye-resistant properties to the nylon by forming salt with amine end groups of unmodified molecules, thereby rendering these amine groups no longer available to absorb acid dyes.

While the use of mono-sulfonated compounds for producing modified polycarbonamides having acid dye-resistance and basic dyeability properties is known in the art, the specific sulfonates and the various manipulative steps employed herein for producing modified polyamides in order to achieve highly desirable results are not known to be suggested by the art.

In accordance with my invention, in the production of a polycarbonamide, herein referred to as polyamide, an alkali metal salt of an aminobenzene-sulfonic acid is incorporated in the polymerization recipe to improve the dyeability of the polyamide with basic dyes. Although the sulfonate-modified polyamides of this invention are particularly useful in the preparation of fibers, they are also of value in the production of sheet materials, films, molded articles, and the like. These sulfonate-modified polyamides can constitute substantially all of the polymer and compositions so used, or they can represent one component of the blend of polymers, such as in a blend of polypropylene or other polymer having insufficient affinity for basic dye.

It is therefore an object of the present invention to provide modified polyamides having sufficient affinity for basic dyestuffs to provide modified nylon possessing all of the characteristics essential for use in manufacturing multi-yarn fabrics, sheet materials, films, molded articles, and the like. Other objects will become apparent from the description which follows.

These objects are obtained by the polyamides of the present invention which comprise modified polyamides having improved acid dye-resistance and basic dyeability properties, wherein said polyamides contain, as an integral part of the polymer chain, recurring amide linkages and terminal sulfonate groups resulting from alkali metal salts of aminobenzenesulfonic acids. Suitable alkali metal salts of aminobenzenesulfonic acids can be represented by the formula

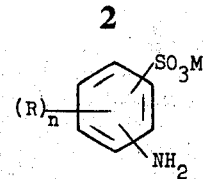

where M is an alkali metal, each R is an alkyl group having 1–4 carbon atoms, and $n$ is 0–2. Thus, suitable alkali metal salts of aminobenzenesulfonic acids include the lithium, sodium, potassium, rubidium, and cesium salts of orthanilic acid (o-aminobenzenesulfonic acid), metanilic acid (m-aminobenzenesulfonic acid), and sulfanilic acid (p-aminobenzenesulfonic acid), as well as mono- and dialkyl derivatives of these acids wherein each alkyl group is selected from methyl, ethyl, propyl, isopropyl, butyl, isobutyl, sec-butyl, and tert-butyl. Mixtures of these salts can also be employed. Some examples of applicable alkali metal salts of aminobenzenesulfonic acids include lithium orthanilate, sodium metanilate, sodium sulfanilate, potassium 3-amino-4-methylbenzenesulfonate, soduim 3-ethyl-4-aminobenzenesulfonate, rubidium 2-amino-3-methyl-4-isopropylbenzenesulfonate, cesium 3-tert-butyl-4-aminobenzenesulfonate, lithium 3-propyl-4-aminobenzenesulfonate, potassium 2-amino-5isobutylbenzenesulfonate, sodium 2-sec-butyl-5-aminobenzenesulfonate, and sodium 3,5-dibutyl-4-aminobenzenesulfonate.

According to the invention, a polycarbonamide composition having improved acid dye-resistance and basic dyeability properties, wherein recurring amide linkages and terminal sulfonate groups are integral parts of a polymer chain, is comprised of polyamide-forming compositions selected from the group consisting of amino acids, lactams, dicarboxylic acids and diamines, and salts of dicarboxylic acids and diamines; and an alkali metal salt of an aminobenzenesulfonic acid having a formula;

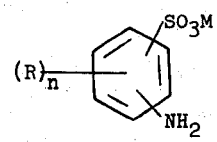

wherein M is an alkali metal, R is an alkyl group having 1 to 4 carbon atoms and $n$ is an integer of from 0 to 2. The polycarbonamide can be formed by polymerizing in the presence of alkali metal salts of aminobenzenesulfonic acids, for example, a polyamide-forming composition selected from the group consisting of (A) substantially equimolecular proportions of a dicarboxylic acid having the formula $HO_2CR'CO_2H$ and a diamine having the formula $H_2NR'NH_2$, and (B) an aminocarboxylic acid having the formula $H_2NR'CO_2H$, wherein each R' is a divalent hydrocarbon radical having from about 2 to about 18 carbon atoms per molecule.

The R' in the dicarboxylic acid, the diamine, or the amino acid can be a divalent hydrocarbon radical containing 2 to about 18 carbon atoms. Typical dicarboxylic acids which can be used include succinic acid, glutaric acid, adipic acid, 2-methyladipic acid, pimelic acid, suberic acid, azelaic acid, sebacic acid, undecanedioic acid, dodecanedioic acid, tetradecanedioic acid, octadecanedioic acid, eicosanedioic acid, p-phenylenediacetic acid, isophthalic acid, terephthalic acid, hexahydroterephthalic acid, and the like, and mixtures thereof. Typical diamines which can be used include ethylenediamine, propylenediamine, tetramethylenediamine, pentamethylenediamine, hexamethylenediamine, octamethylenediamine, nonamethylenediamine, 5-methylnonamethylenediamine, decamethylenediamine, dodecamethylenediamine, octadecamethylenediamine, p-phenylenediamine, p-xylenediamine, 1,4-cyclohexanediamine, 1,4-bis(aminomethyl)cyclohexane, bis(4-aminocyclohexyl)methane, and the like, and mixtures thereof. If desired, the diamine can be employed as a salt of the dicarboxylic acid, e.g., nylon 6-6 salt from hexamethylenediamine and adipic acid. Typical amino acids which can be used include 3-aminopropionic acid, 6-aminocaproic acid, 4-ethyl-6-aminohexanoic acid, 9-aminononanoic acid, 12-aminododecanoic acid, 19-aminononadecanoic acid, 4-aminocyclohexanecarboxylic acid, 4-(aminomethyl)cyclohexanecarboxylic acid, 4-(aminomethyl)benzoic acid, and the like, and mixtures thereof. Derivatives of these monomers known to be useful in the production of polyamides can be used in place of the above monomers. As examples, a corresponding ester or acid halide can be used in place of a dibasic acid, and the corresponding lactam can be employed instead of an amino acid.

In the production of the polyamides of this invention, the polyamide-forming monomer(s) are polymerized in the presence of an alkali metal salt of an aminobenzenesulfonic acid, said alkali metal salt being present in an amount of 0.05-4, preferably 0.1-2 mole percent, based on the moles of recurring units in the polyamide product. For illustrative purposes, each mole of recurring units in the polymer product can, for example, result from 1 mole of an amino acid, from 1 mole of lactam, from 1 mole of each of a dicarboxylic acid and a diamine, or from the salt from 1 mole of a dicarboxylic acid and 1 mole of a diamine. When a dicarboxylic acid and a diamine are used, or when the corresponding salt is used, it is preferable to have present a slight excess of the dicarboxylic acid to keep relatively low the concentration of amine groups in the polymer and to provide carboxyl groups in the growing polymer chain for reaction with the alkali metal salt of the aminobenzenesulfonic acid.

The aminobenzenesulfonic acid can be employed directly as an alkali metal salt, or the alkali metal salt can be produced in the polymerization reactor, e.g., by reaction of the free aminobenzenesulfonic acid with an alkali metal hydroxide. Although an alkali metal hydroxide can be present with the alkali metal salts of any of the aminobenzenesulfonic acids, and when present will be used in an amount within the range of 50 to 300 mol percent based on the sulfonate salt present, its presence is preferred with salts of the o- and p-aminobenzenesulfonic acids to prevent decomposition of the sulfonate modifiers and coloration of the polymer during the polymerization process. Thus, when the o- or p-aminobenzenesulfonates are employed, it is desirable that there be present an amount of alkali metal hydroxide equal to about 50-300 mole percent, preferably about 50-150 mole percent, of the sulfonate salt present.

The reactants are heated at a temperature of from about 360°-620°F., preferably about 400°-600°F., until the resulting polymer has a sufficiently high molecular weight, e.g., as indicated by an intrinsic viscosity of at least 0.4 if it is desirable that the polymer exhibit fiber-forming properties. The reaction can be conducted at superatmospheric, atmospheric, or subatmospheric pressure. Often it is desirable, especially in the last stage of the polymerization, to employ conditions, e.g., reduced pressure, which will aid in the removal of reaction by products.

The invention is illustrated by the following examples, which are not limitative.

EXAMPLE I

To prepare a modified polyamide through use of sodium metanilate in an amount of 1.5 mole percent based on nylon 6-6 salt employed, a mixture of 1120 g. of an aqueous solution of 524 g. (2.00 moles) of nylon 6-6 salt, 5.19 g. (0.030 mole) of metanilic acid, 2.920 g. (0.020 mole) of adipic acid, 30 ml. of 1.0 N sodium hydroxide (0.030 equivalent), and 1 ml. of Dow Corning Antifoam C composition was heated in an autoclave at about 450°-540°F. for approximately 3 hours, during which time steam was vented under a pressure which declined from about 320 psig initially to a final pressure of about 11 inches Hg absolute. The resulting polyamide had an inherent viscosity (at 30°C. in m-cresol, 0.5 weight percent concentration) of 0.84 and a sulfur content of 0.20 weight percent, with 13 microequivalents of amine groups and 109 microequivalents of acid groups per gram of polymer.

EXAMPLE II

To prepare a modified polyamide through use of sodium metanilate in an amount of 2.0 mole percent based on nylon 6-6 salt employed, a mixture of 1120 g. of an aqueous solution of 524 g. (2.00 moles) of nylon 6-6 salt, 6.92 g. (0.040 mole) of metanilic acid, 2.920 g. (0.020 mole) of adipic acid, 40 ml. of 1.0 N sodium hydroxide (0.040 equivalent), and 1 ml. of Dow Corning Antifoam C composition was heated in an autoclave at about 460°-540°F for approximately 3 hours, during which time steam was vented under a pressure which declined from about 340 psig initially to a final pressure of about 11 inches Hg absolute. The resulting polyamide had an inherent viscosity (at 30°C in m-cresol, 0.5 weight percent concentration) of 0.86 and a sulfur content of 0.28 weight percent, with 59 microequivalents of amine groups and 96 microequivalents of acid groups per gram of polymer.

EXAMPLE III

To prepare a modified polyamide through use of sodium sulfanilate in an amount of 1.0 mole percent based on nylon 6-6 salt employed, a mixture of 1150 g. of an aqueous solution of 524 g. (2.00 moles) of nylon 6-6 salt, 3.820 g. (0.020 mole) of sulfanilic acid monohydrate, 2.920 g. (0.020 mole) of adipic acid, 40 ml. of 1.0 N sodium hydroxide (0.040 equivalent), and 1 ml. Dow Corning Antifoam C composition was heated in an autoclave at about 450°-540°F. for approximately 3 hours, during which time steam was vented under a pressure which declined from about 340 psig initially to a final pressure of about 12 inches Hg absolute. The resulting polyamide had an inherent viscosity (at 30°C. in m-cresol, 0.5 weight percent concentration) of 1.09 and a sulfur content of 0.15 weight percent, with 11 microequivalents of amine groups and 98 microequivalents of acid groups per gram of polymer.

EXAMPLE IV

A modified polyamide was prepared essentially in accordance with the procedure given in Example III, using the same reactants in the same amounts. The resulting polyamide had an inherent viscosity (at 30°C. in m-cresol, 0.5 weight percent concentration) of 0.83 and a sulfur content of 0.14 weight percent, with 36 microequivalents of amine groups and 97 microequivalents of acid groups per gram of polymer.

EXAMPLE V

To prepare a modified polyamide through use of sodium sulfanilate in an amount of 2.0 mole percent based on nylon 6-6 salt employed, a mixture of 1120 g. of an aqueous solution of 524 g. (2.00 moles) of nylon 6-6 salt, 9.25 g. (0.040 mole) of sodium sulfanilate dihydrate, 2.920 g. (0.020 mole) of adipic acid, 30 ml. of 1.0 N sodium hydroxide (0.030 equivalent), and 1 ml. of Dow Corning Antifoam C composition was heated in an autoclave at about 450°–535°F. for approximately 3 hours, during which time steam was vented under a pressure which declined from about 330 psig initially to a final pressure of about 18 inches Hg absolute. The resulting polyamide had an inherent viscosity (at 30°C. in m-cresol, 0.5 weight percent concentration) of 1.02 and a sulfur content of 0.29 weight percent, with 48 microequivalents of amine groups and 77 microequivalents of acid groups per gram of polymer.

EXAMPLE VI

In a control run employing no sulfonate, a modified polyamide outside the scope of this invention was prepared by heating a mixture of 1235 g. of an aqueous solution of 524 g. (2.00 moles) of nylon 6-6 salt, 2.920 g. (0.020 mole) of adipic acid, and 1 ml. of Dow Corning Antifoam C composition in an autoclave at about 440°–540°F for approximately 3½ hours, during which time steam was vented under a pressure which declined from about 340 psig initially to a final pressure of about 14 inches Hg absolute. The resulting polyamide had an inherent viscosity (at 30°C in m-cresol, 0.5 weight percent concentration) of 1.14, with 20 microequivalents of amine groups and 114 microequivalents of acid groups per gram of polymer.

EXAMPLE VII

In a control run employing no sulfonic acid or salt thereof, a modified polyamide outside the scope of this invention was prepared by heating a mixture of 1151 g. of an aqueous solution of 524 g. (2.00 moles) of nylon 6-6 salt, 1.20 g. (0.020 mole) of acetic acid, and 1 ml. of Dow Corning Antifoam C composition in an autoclave at about 450°–540°F for approximately 3 hours, during which time steam was vented under a pressure which declined from about 340 psig initially to a final pressure of about 19 inches Hg absolute. The resulting polyamide had an inherent viscosity (at 30°C in m-cresol, 0.5 weight percent concentration) of 1.01, with 20 microequivalents of amine groups and 75 microequivalents of acid groups per gram of polymer.

EXAMPLE VIII

The modified polyamide products of Examples I–VII were evaluated by spinning and drawing into fibers having a denier of about 180/12, followed by determination of basic dyeability and resistance to an acid dye. The basic dye uptake (BDU) was determined using Sevron Blue 2G dye, and the results were expressed as microequivalents of dye absorbed per gram of fiber. Staining by an acid dye was determined in competitive dyeing with deep dyeable Rhodiaceta nylon using Acid Light Scarlet GL by visually observing the extent of staining. The results are summarized in the following table.

TABLE

| Source of Modified Polyamide | BDU, microequivalents of dye/gram fiber | Acid Dye Staining |
|---|---|---|
| Example I | 26.2 | None |
| Example II | 26.5 | None |
| Example III | 21.8 | None |
| Example IV | 26.4 | None |
| Example V | 26.8 | None |
| Example VI | 17.1 | None |
| Example VII | 14.0 | Stained |

Columns 2 and 3 of the table hereinabove were prepared according to the following procedures.

Preparation of the fiber consisted of dissolving 4 g. of sodium perborate, 0.5 g. of Alkanol CN and 0.25 g. of trisodium phosphate in 4 liters of water and stirring until dissolved, weighing out roughly about 10 g. of fiber (sock, fabric), and placing in a beaker where the above scouring solution (50 cc for each gram of fiber) was added. The temperature was raised gradually with stirring up to 180°F for 15 minutes. The fiber was then removed and rinsed thoroughly in warm tap water. This was allowed to dry.

Preparation of the dye solution consisted of dissolving 2 g. of sodium acetate and 1 g. of Merpol HCS in 4 liters of distilled water. Dilute acetic acid was added until the pH was 6.0 (used pH meter and eyedropper). About 300 cc of this solution was transferred into a 1-liter volumetric flask. An amount (1.750 ± 0.001 g.) of Sevron Blue 2G was accurately weighed in an aluminum dish and transferred quantitatively into the above volumetric flask, using a funnel and a squirt bottle filled with the above solution at pH 6.0 to ascertain complete transfer. This solution was diluted to mark and stirred for 1 hour with a magnetic stirrer when the solution is ready for use. The solution so prepared is sufficient to dye 25 g. of fiber (assuming 40/1 liquor/fiber ratio).

The dyeing procedure consisted of weighing out 8 ± 0.05 g. of fiber and placing it in a clean and dry stainless steel cup from the Launder-ometer where dye solution of 320 cc was added (using automatic buret). The cup was closed securely and placed in the holder of the Launder-ometer. The thermostat should be adjusted before weighing the fiber in order that the bath temperature could be 110°F. The thermostat was then reset to the boil, the lid closed, and the agitator turned on and left for exactly 120 minutes. After this time, the agitator and heater were stopped and the cups were removed, using asbestos gloves, and opened as soon as possible. About 50 cc of the residual dye liquor was transferred into a dry container (vol. flask, jar with a lid, etc.) and submitted to the instrument laboratory for optical density determination.

Optical density measurements and calculations of results were determind by allowing 15 minutes for instrument warm-up, setting spectrophotometer monochromator to 635 nm, locking in reading, then adjusting the instrument to zero with water in the 1 cm sample and reference cells. If necessary, the dye solution was diluted to a dye concentration (measured by instrument) and pH adjustment was made of the pH of the dye solution to pH 7 ± 0.5 with diluted acetic acid or sodium hydroxide. Solution A absorbence was measured against water and the value was recorded to the nearest 0.005 and the dilution factor D if dilution were to be made. The formula used for reporting the result of BDU was BDU = 3.795 (7.95 − A × D) where A and D are absorbence and dilution factors as above.

The acid dye-resist procedure consisted of scouring with a solution containing 1 percent Alkanol WXN and 1 percent tetrasodium pyrophosphate (TSPP) owf (i.e., 1 g of each per 4 liters), using 50 cc of this solution per g. of fiber. Temperature was 130°F at start of procedure, then raised to 160°F and run for 15 minutes before cooling and rinsing.

Previously scoured deep dyeable Rhodiaceta Nylon (2.5 ± 0.1 g.) and an experimental yarn (2.5 ± 0.1 g.) were combined by placing them in a 400 ml. beaker.

Preparation of dye solution consisted of preparing 4 liters (deionized water) of solution containing 1.0 g. of STEROX NJ (available from Monsanto) and enough monosodium phosphate to bring pH to 6.0. This dye solution was called Solution A.

psig nitrogen. The solid polymer was chopped up in a Wiley Mill and the inherent viscosity and dyeing tests were made with this chip. Hot water extraction of the chip would remove any monomer (about 6–8 percent is equilibrium) and give a higher value for inherent viscosity. This monomer was extracted in the dyebath. A dicarboxylic acid having 2–18 carbon atoms (adipic acid in this example) is preferably present in an amount within the range of 0.001 to 0.05 moles per mole of recurring amide linkages.

1.00 g. of chip, 10.0 ml. of a solution of Tanapol ME (0.25 g/l) wetting agent, 10.0 ml. of a solution of Astrazon Blue BG (Color Index 51005, Basic Blue 3), and 30 ml. of deionized water were placed in a 125 ml. erlenmeyer flask. The flask was held in a boiling water bath for 2 hours. The dyed chip was washed with successive portions of water combined to 100 ml., the chip collected on a filter and washed further.

| Run No. | Adipic[d] Acid | Sodium[d] Sulfanilate | NaOH[e] | IV[a] | Color of Chip | 1% owf Color of dyed chip |
|---|---|---|---|---|---|---|
| 1 | 0.4 | 0 | 0 | 0.71 | White | Dark Blue |
| 2 | 0.4 | 1.0 | 0 | 0.64 | Tan | Med Blue |
| 3 | 0.4 | 1.0 | 56 | 0.69 | Tan | Med Blue |
| 4 | 0.4 | 1.0 | 90 | 0.68 | Tan | Dark Blue[b] |
| 5 | 0.4 | 1.0 | 125 | 0.67 | White | Very Dark Blue[c] |
| 6 | 0.5 | 1.0 | 98 | 0.71 | Slightly Off-White | Dark Blue[b] |

[a]0.5 g/l of m-cresol at 30°C
[b]Shading was 4 <1 <6
[c]Second washings were white, rest (Runs 1–4 and 6) were tinted blue with 1 the deepest.
[d]mole per cent based on moles caprolactam
[e]mole per cent based on moles of Na Sulfonilate Dye solution B was prepared by weighing 1.0 ± 0.01 grams of Acid Light Scarlet GL or Merpacyl Red B and dissolving in 1 liter (volumetric flask) of Solution A. Solutions were stirred for 1 hour.

Solution A (150 cc) was added to the combined yarns and agitated gently for at least 10 minutes, then 50 cc of Solution B was added. The beaker was covered with watch glass and heated slowly to the boil (about 45 minutes until boil). Boiling chips were added and kept at the boil for 1 hour with occasional stirring. The yarns were cooled, rinsed, dried and stapled together.

The above table shows that the modified polymers of Examples I–V, all within the scope of the invention, possessed greater dyeability with the basic dye than did the modified polyamides of Examples VI and VII which were control polymers outside the scope of the invention.

EXAMPLE IX

Various samples of nylon 6 were prepared utilizing the following formula
226 g (2.00 moles) caprolactam
1.17 g (0.008 mole) adipic acid
4.62 g (0.020 mole) sodium sulfanilate
3.8 g (0.20 mole) water
variable sodium hydroxide pellets These ingredients were placed in a 2-liter stirred reactor, air was displaced by nitrogen, and the system heated under autogenous pressure to 255°C and held there for 3.0 hours. The pressure was lowered to atmospheric slowly over 10 to 35 minutes. Then nitrogen was slowly bubbled through the melt at 0.020 scfh (standard cubic feet per hour) for 3.0 hours. The polymer melt was slowly extruded onto dry ice by 30 to 50

These results show that a basic dyeable nylon 6 can be prepared with sodium sulfanilate when a sufficient amount of sodium hydroxide is present so that the polyamide is white and this basic dyeable material further being wash resistant (5).

The control nylon 6 (1) has many carboxylic acid groups which are basic dye receptors, but the dye is not wash resistant. The minimum amount of NaOH is determined by the amount of color that can be tolerated (or covered up) in a fiber and the depth of shade and wash resistance desired.

Since may departures from the specifically exemplified embodiments may be made which are within the spirit and scope of this invention, limitations are to be regarded only as set out in the claims which follow.

What is claimed is:

1. A process for preparing a fiber forming modified aliphatic polycarbonamide wherein amide linkages and terminal sulfonate groups are integral parts of a polymer chain, comprising reacting under polymerization conditions at a temperature of 360°F to 620°F (a) at least one polyamide-forming component selected from the group consisting of an amino acid and a lactam and (b) 0.05 to 4 mole percent based on the moles of recurring amide linkages in said polycarbonamide of at least one basic dyeability modifier having the formula

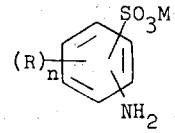

wherein M is an alkali metal, R is an alkyl group having 1 to 4 carbon atoms and $n$ is an integer having a value within the range of 0 to 2, in the presence of (c) 50–300 mole percent of an alkali metal hydroxide per mole of said dyeability modifier.

2. A method according to claim 1 wherein said polyamide-forming component is a lactam.

3. A method according to claim 1 wherein said modifier is present in an amount within the range of 0.1 to 2 mole percent.

4. A method according to claim 1 wherein said polyamide-forming component is caprolactam.

5. A method according to claim 1 wherein said alkali metal salt is a salt of o- or p- aminobenzenesulfonic acid.

6. A method according to claim 1 wherein said alkali metal hydroxide is sodium hydroxide.

7. A method according to claim 6 wherein said alkali metal salt is sodium sulfanilate and wherein there is present in addition adipic acid.

8. A method according to claim 1 wherein there is present in addition during said reacting a dicarboxylic acid.

9. A method according to claim 8 wherein said polyamide-forming component is caprolactam, said alkali metal salt is sodium sulfanilate, said alkali metal hydroxide is sodium hydroxide, and said dicarboxylic acid is adipic acid present in an amount within the range of 0.001 to 0.05 moles per mole of recurring amide linkages.

10. The fiber forming polyamide consisting essentially of the polycarbonamide made by the process of claim 8.

11. The fiber forming polyamide consisting essentially of the polycarbonamide made by the process of claim 1.

* * * * *